United States Patent
Wang

(10) Patent No.: US 6,974,543 B2
(45) Date of Patent: Dec. 13, 2005

(54) MAGNETIC-ENERGY-RELEASING MOLECULAR REARRANGING STRUCTURE

(76) Inventor: Jen Chien Wang, 2nd Fl., No. 31-1, Alley 452, Ta-Yih Rd., Taipei (TW)

( * ) Notice: Subject to any disclaimer, the term of this patent is extended or adjusted under 35 U.S.C. 154(b) by 177 days.

(21) Appl. No.: 10/345,241

(22) Filed: Jan. 16, 2003

(65) Prior Publication Data

US 2004/0140253 A1   Jul. 22, 2004

(51) Int. Cl.$^7$ .............................................. B01D 35/06
(52) U.S. Cl. ............... 210/222; 210/695; 252/62.51 R; 252/62.56
(58) Field of Search .............................. 210/222, 695; 252/62.51 R, 62.53, 62.56

(56) References Cited

FOREIGN PATENT DOCUMENTS

JP          55-61906      *  5/1980

OTHER PUBLICATIONS

PTO-2005-5146-Translation of Japanese Kokai Patent Publication No. 55-061906, published May 1980.*

* cited by examiner

*Primary Examiner*—David A. Reifsnyder
(74) *Attorney, Agent, or Firm*—Rosenberg, Klein & Lee

(57) ABSTRACT

A magnetic-energy-releasing molecular rearranging structure includes an amount of magnetic powder, which is molded into a magnetic member in the form of a ball, a mass, or a flat piece, and having magnetic-energy-releasing molecules, so that the member has magnetic lines that together with earth poles produce a radiated magnetic field. Superficial molecules of a solid body and a liquid, or air molecules in a limited space may be magnetized and rearranged using the magnetic-energy-releasing member, and molecules of a substance that is to be magnetized may be magnetized and rearranged through magnetic energy transmission from the magnetized molecules of the solid body, the liquid, or the air in the limited space to the substance.

1 Claim, 5 Drawing Sheets

MAGNETIC-ENERGY-RELEASING MOLECULAR REARRANGING STRUCTURE

BACKGROUND OF THE INVENTION

The present invention relates to a magnetic-energy-releasing molecular rearranging structure, and more particularly to a magnetic-energy-releasing molecular rearranging structure capable of magnetizing and rearranging molecules of a solid body, a liquid, or air in a limited space and thereby causing a molecular magnetizing and rearrangement of another substance through magnetic energy transmission from the solid body, the liquid, or the air in the limited space to the substance.

Magnetic lines have been widely applied to different fields, and proven physiological effective in terms of human health. There are patent applications involving magnetic lines being allowed in many countries. It has been wrongly considered by most people that the distribution of magnetic lines is always in a plane. As a matter of fact, magnetic lines are radially distributed in a space. These radially distributed magnetic lines produced by electric fields have effects on more than 98% of tiny particles in the air that are diametrically smaller than 1 micrometer (micron) and normally not affected or carried away by airflow when they diffuse.

FIG. 1 is a sectional view of a prior patented magnetizing structure for water filter developed according to the aforesaid principles in connection with magnetic lines. In this conventional magnetizing structure for water filter, there is included a magnetizer 11, rare-earth permanent magnets 12, and magnetically conductive iron plates 13 for generating and always maintaining a uniform magnetic-energy field. Water flowing through the magnetizing structure is subject to successive vertical cutting by magnetic lines, resulting in water molecular rearrangement and changes in water physical and physiological properties to produce tasty and heath giving water.

FIG. 2 is a sectional view of a prior patented magnetic-energy-type activating unit consisting of permanent magnets 21, water passages 22, and water guiding plates 23 for producing magnetized water for washing and cleaning purpose. In the course of magnetizing water, water molecules with high resonant energy are produced to remove dirt and clean different articles.

In either of the above-mentioned magnetic-line producing structures, traditional magnets, such as the rare-earth permanent magnets 12 and the permanent magnets 21, are adopted as magnetic-energy producing elements. A disadvantage of such traditional magnets is their magnetic fields are restricted to fixed directions and limited regions by magnetic poles N and S of the magnets. Therefore, these magnetic-line producing structures of prior art have only limited applications.

SUMMARY OF THE INVENTION

A primary object of the present invention is to provide a magnetic-energy-releasing molecular rearranging structure, of which the magnetic energy releasing is not restricted by a magnetic polarity of magnetic fields produced by the structure, so that the structure can be used to magnetize and rearrange molecules of a solid body, a liquid, or air in a limited space, and molecules of another substance to be magnetized can be magnetized and rearranged through magnetic energy transmission from such magnetized molecules of solid body, liquid, or air to the substance.

The magnetic-energy-releasing molecular rearranging structure of the present invention is formed by molding an amount of magnetic powder into a magnetic member in the form of a ball, a mass, or a flat piece, so that the magnetic lines of the molded magnetic member together with earth poles produce a radiated magnetic field, enabling the magnetic member to be used without being limited to a certain magnetic field direction and/or region.

The magnetic-energy-releasing molecular rearranging structure of the present invention may be used in a liquid to magnetize and rearrange molecules of the liquid, and another substance to be magnetized may be further magnetized and rearranged through magnetic energy transmission from the liquid to the substance.

The magnetic-energy-releasing molecular rearranging structure of the present invention may be used in a solid body to magnetize and rearrange molecules of the solid body, and another substance to be magnetized may be further magnetized and rearranged through magnetic energy transmission from the solid body to the substance.

The magnetic-energy-releasing molecular rearranging structure of the present invention may also be used in a limited space to magnetize and rearrange molecules of air in the limited space, and another substance to be magnetized may be further magnetized and rearranged through magnetic energy transmission from the air to the substance.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
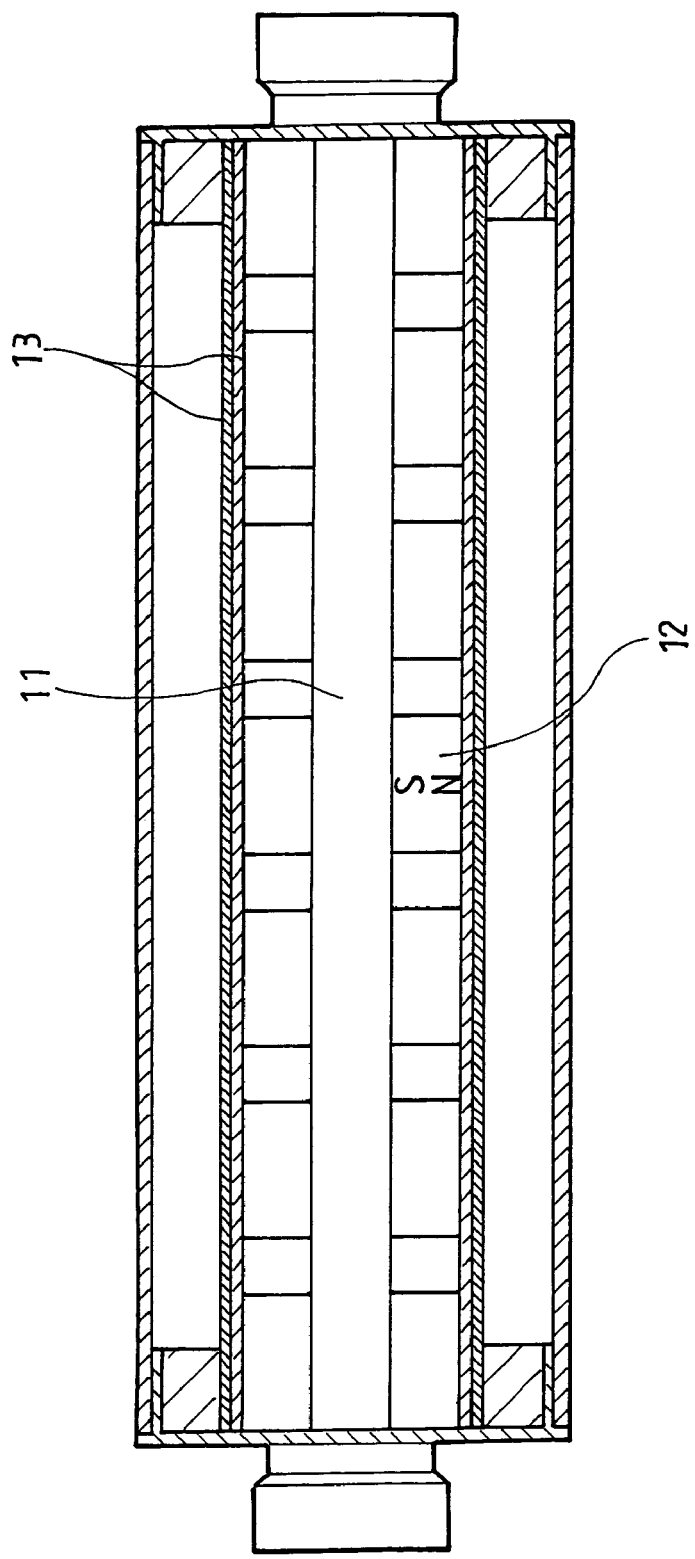
FIG. 1 is a sectional view of a conventional magnetizing structure for water filter.
Figure 2:
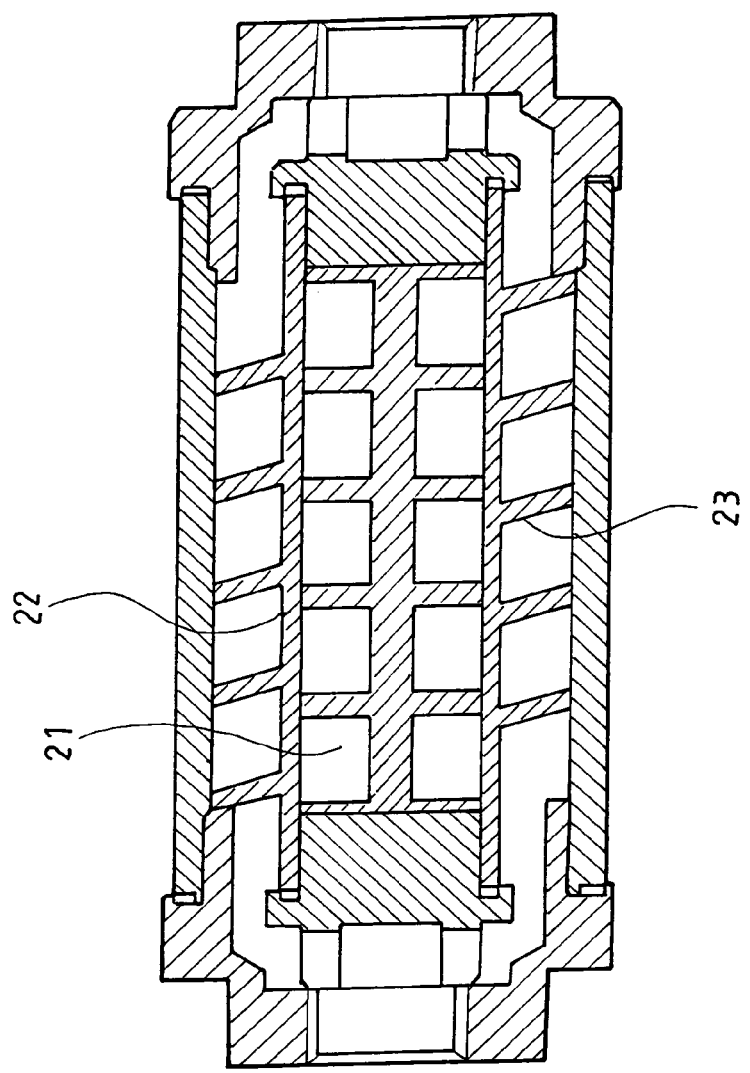
FIG. 2 is a sectional view of a conventional magnetic-energy-type activating unit.
Figure 3:
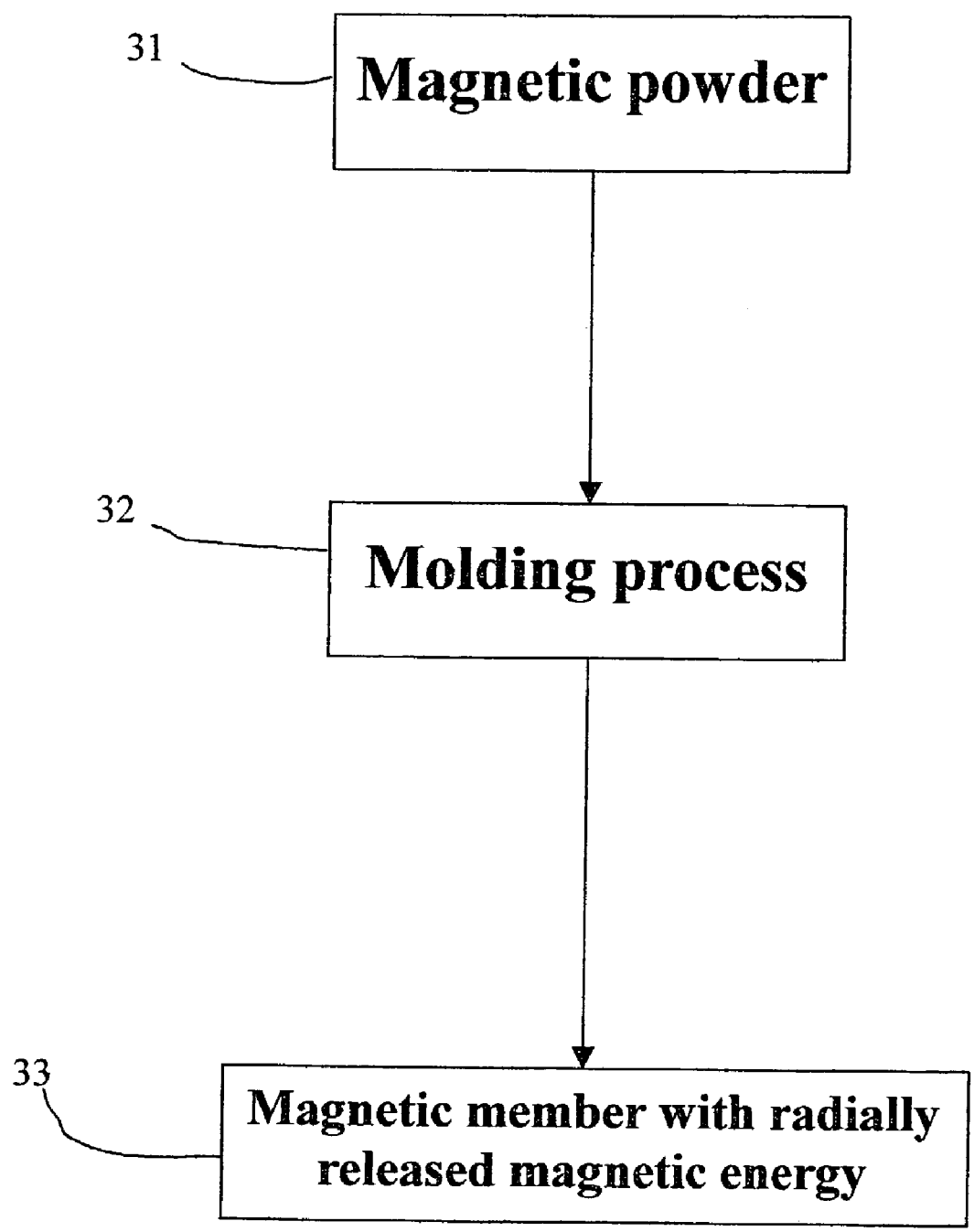
FIG. 3 is a flowchart showing the forming of a magnetic-energy-releasing molecular rearranging structure according to the present invention.

Please refer to FIG. 3 that is a flowchart showing the forming of a magnetic-energy-releasing molecular rearranging structure according to the present invention. First, an amount of magnetic powder 31 is prepared. The magnetic powder 31 is then subjected to a molding process 32 to produce a magnetic-energy-releasing member 33 in the form of a ball, a mass, or a flat piece. Since the member 33 is formed through binding of an amount of magnetic powder 31, its magnetic lines and earth magnetic poles together produce a radiated magnetic field. This enables the member 33 so produced to be used without being limited to a certain magnetic field direction or region.

Figure 4:
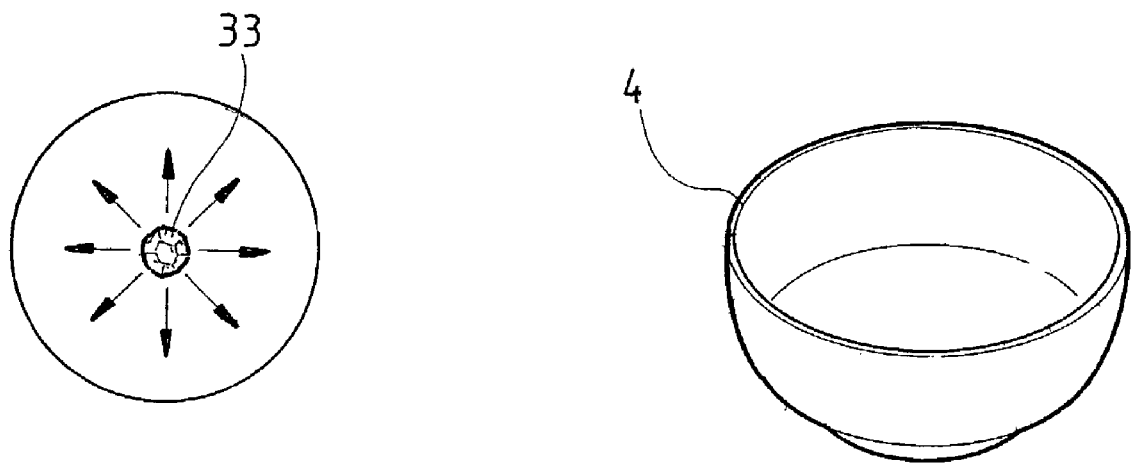
FIG. 4 shows the use of the present invention in a solid body to achieve magnetic energy transmission via the solid body.

Please refer to FIG. 4 that shows a first example of application of the magnetic-energy-releasing member 33 provided according tot the present invention. In this example, the member 33 is associated with a solid body 4, such as a bowl, a cup, or any other type of liquid container, in order to magnetize and rearrange superficial molecules of the solid body 4. Molecules of a substance that is to be magnetized, such as water contained in the solid body 4, are magnetized and rearranged through magnetic energy transmission from the magnetized solid body 4 to the liquid, resulting in changes in physical and physiological properties of the substance, or production of purified water.

Figure 5:
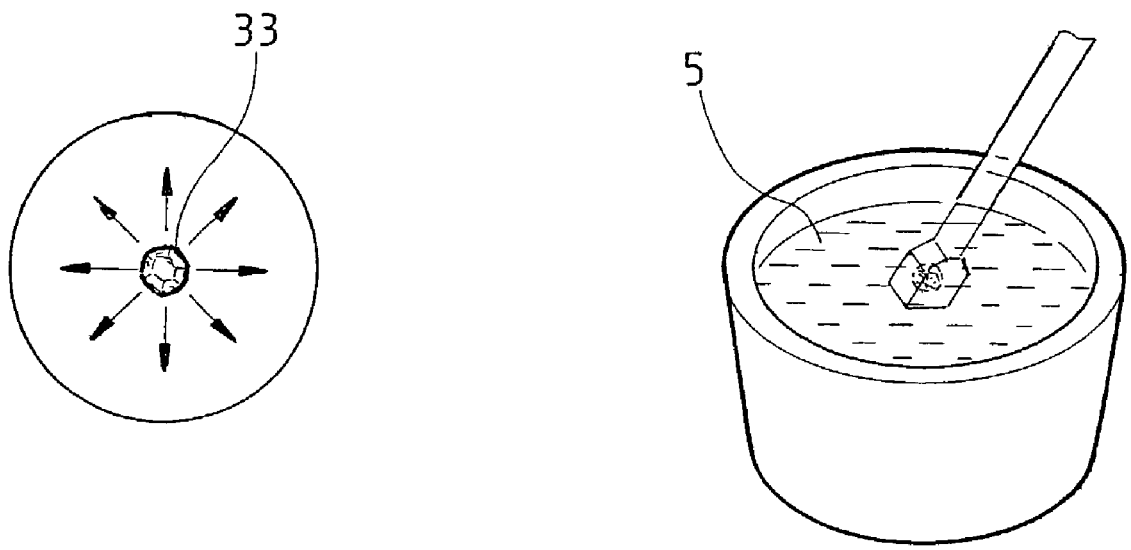
FIG. 5 shows the use of the present invention in a liquid to achieve magnetic energy transmission via the liquid.

FIG. 5 shows a second example of application of the magnetic-energy-releasing member 33 of the present invention. In this example, the member 33 is directly positioned in a type of liquid 5, such as water, wine, etc., to magnetize and rearrange molecules of the liquid. The magnetized liquid is then used to contact with (such as to wash) a substance that is to be magnetized, so that molecules of the substance are magnetized and rearranged through magnetic energy transmission from the magnetized liquid 5 to the substance.

Figure 6:
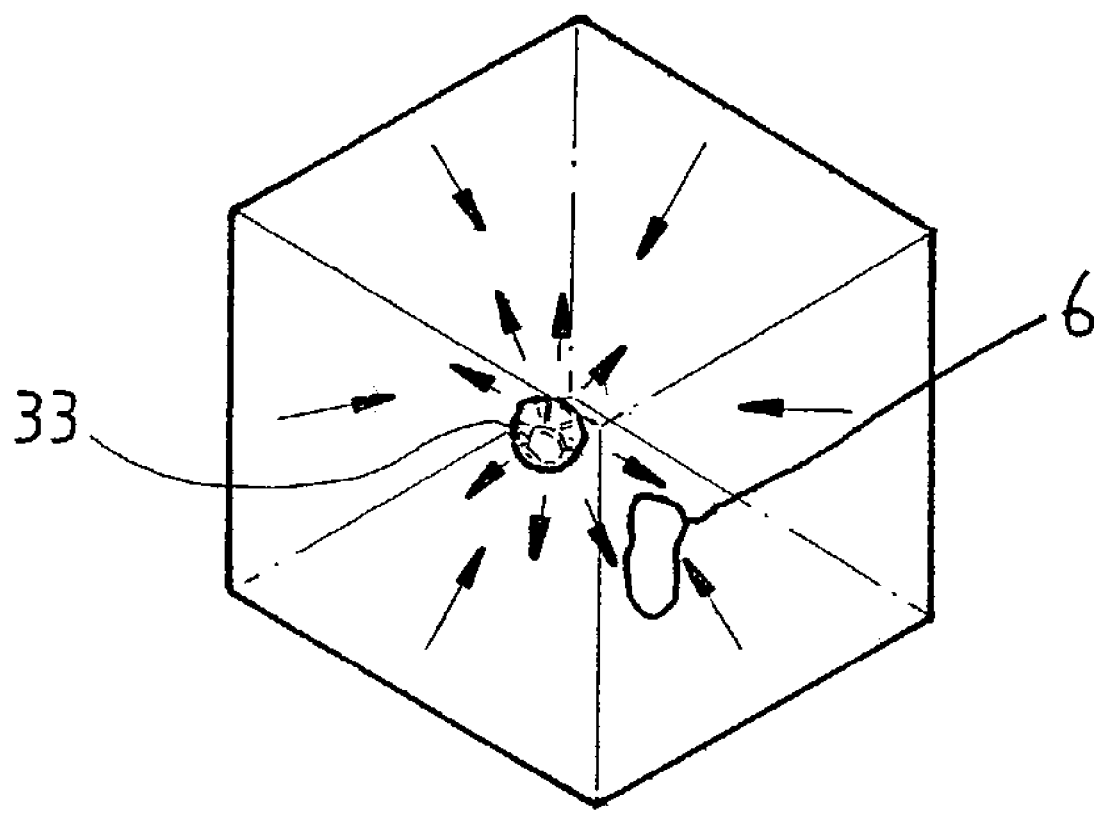
FIG. 6 shows the use of the present invention in air in a limited space to achieve magnetic energy transmission via the air.

FIG. 6 shows a third example of application of the magnetic-energy-releasing member 33 of the present invention. In this example, the member 33 is positioned in a fixed limited space 6 to magnetize and rearrange molecules of air in the limited space. Molecules of a substance that is to be magnetized are then magnetized and rearranged through magnetic energy transmission from the magnetized air molecules to the substance.

When the magnetic-energy-releasing member 33 of the present invention is employed to magnetize water or wine, the magnetized water or wine would taste sweeter. The magnetic-energy-releasing member 33 may be applied to the scope of electrical energy to magnetize and rearrange superficial molecules of metal members, such as electric wires, battery plates, etc., making these metal members to have reduced resistance and accordingly enhanced electrical conductivity and largely increased power. The member 33 may also be used in fuel and/or an engine to upgrade the efficiency thereof, in general clothing and footwear to enhance a wearer's body magnetic fields and blood circulation-through magnetization, and in a fixed space, such as a room, an office, etc., to magnetize and rearrange air molecules therein, and in a vegetable and fruit container to prolong the storage life of vegetable and fruit.

The present invention has been described with a preferred embodiment thereof and it is understood that many changes and modifications in the described embodiment can be carried out without departing from the scope and the spirit of the invention as defined by the appended claims.

What is claimed is:

1. A magnetic-energy-releasing molecular rearranging structure, comprising an amount of magnetic powder, which is molded into a magnetic-energy-releasing member having a non-planar contour to generate magnetic field lines that, together with the Earth's magnetic poles, produce a magnetic field radially extending therefrom, thereby radiating along a non-fixed plurality of magnetic field directions or regions; whereby molecules of a solid body and a liquid, or air molecules in a limited space, are magnetized and rearranged using said radiated magnetic field of said magnetic-energy-releasing member, and molecules of a substance that is to be magnetized may be magnetized and rearranged through magnetic energy transmission from said magnetized molecules of said solid body, said liquid, or said air in said limited space to said substance.

* * * * *